No. 765,920. PATENTED JULY 26, 1904.
H. HAGER.
AUTOMATIC WEIGHING SCALE.
APPLICATION FILED FEB. 25, 1903.
NO MODEL. 2 SHEETS—SHEET 2.

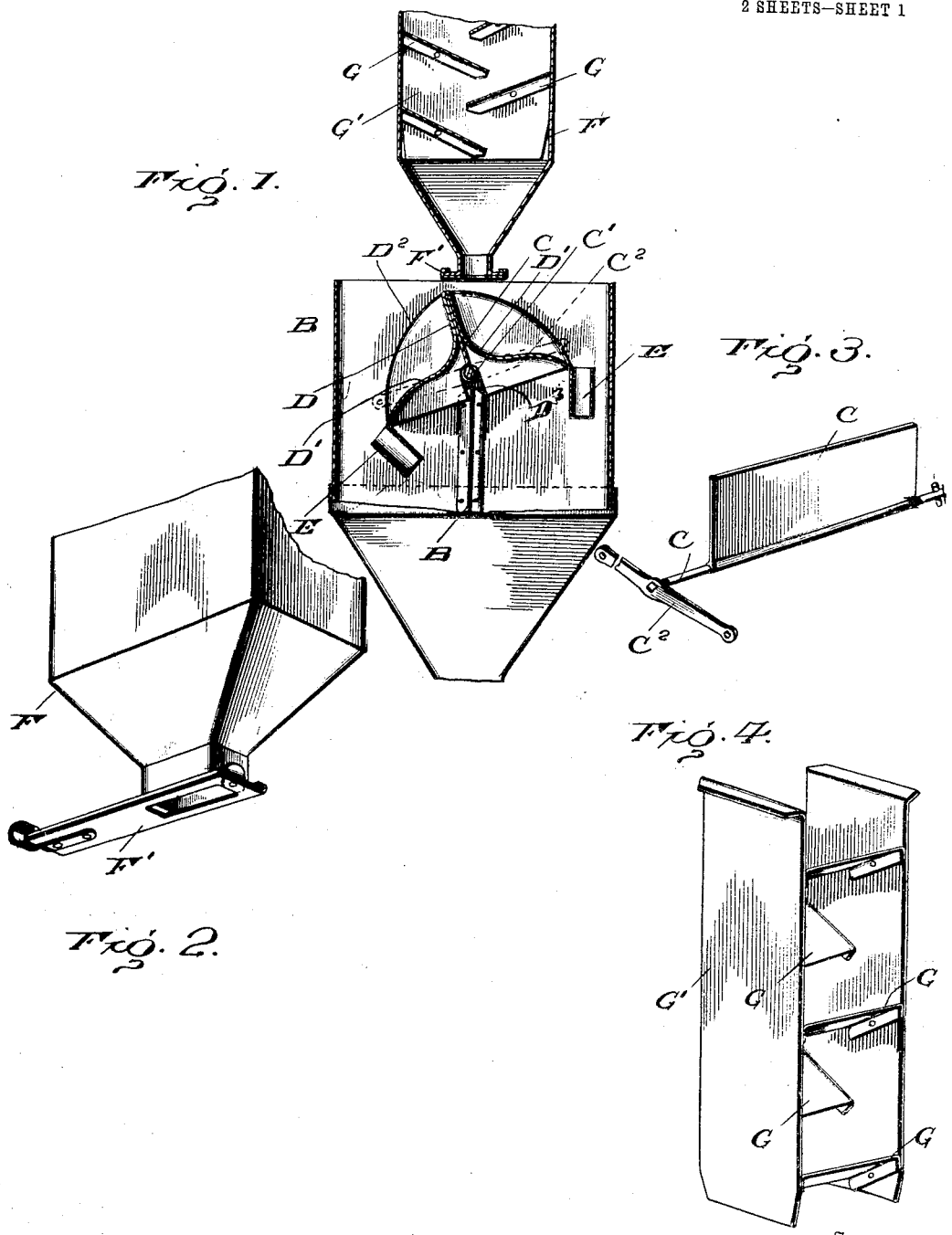

Witnesses
Harry L. Amer
H. H. Masson

Inventor
Harry Hager
E. E. Masson
Attorney

No. 765,920.

Patented July 26, 1904.

UNITED STATES PATENT OFFICE.

HARRY HAGER, OF CHICAGO, ILLINOIS.

AUTOMATIC WEIGHING-SCALE.

SPECIFICATION forming part of Letters Patent No. 765,920, dated July 26, 1904.

Application filed February 25, 1903. Serial No. 145,019. (No model.)

*To all whom it may concern:*

Be it known that I, HARRY HAGER, a citizen of the United States, residing at Chicago, in the county of Cook and State of Illinois, have invented certain new and useful Improvements in Automatic Weighing-Scales, of which the following is a specification.

My invention relates to apparatus for automatically weighing grain, and especially grain of varying specific gravity, such as coffee and the like. The present practice, so far as I am aware, of weighing materials or substances of this kind is to employ an approximately weighing-receptacle adapted to receive from a suspended stream a quantity of material of somewhat less than the required weight and to discharge the same at the proper time into the weighing-machine proper and in conjunction with said receptacle a power-driven feeding device that is arranged to deliver to said receptacle a small continuous stream of material gradually and regularly to the mass already delivered to it by the first feeding device until the proper amount has been received.

It is one object of my present invention to dispense with said supplementary feeding device—*i.e.*, of feeding a small continuous stream to make up the deficit in the scale-pan.

A further object is to provide means for accurately weighing coffee or other grain without the use of a subsidiary stream.

A further object is to provide an accurate weighing device in which the suspended stream is arrested or substantially eliminated.

A further object is to provide a simple, efficient, economical, and otherwise superior feeding mechanism for automatically - operated weighing devices whereby the material to be weighed is delivered progressively and continuously instead of violently or abruptly.

The invention resides in the improvements hereinafter described and claimed.

The nature, characteristic features, and scope of the invention will be more clearly understood from the following description, taken in connection with the accompanying drawings, forming a part hereof, wherein—

Figure 5:
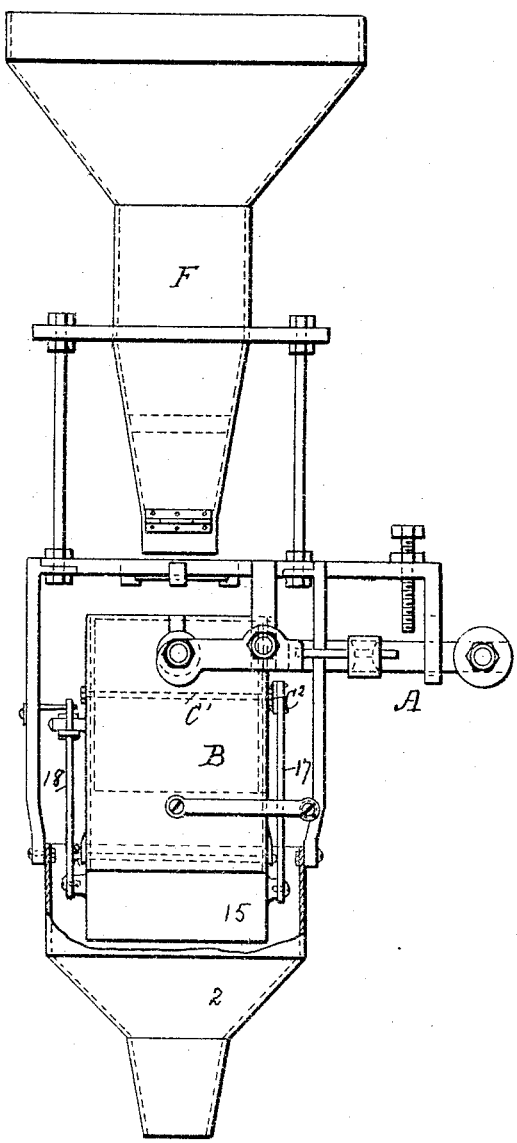
Figure 6:
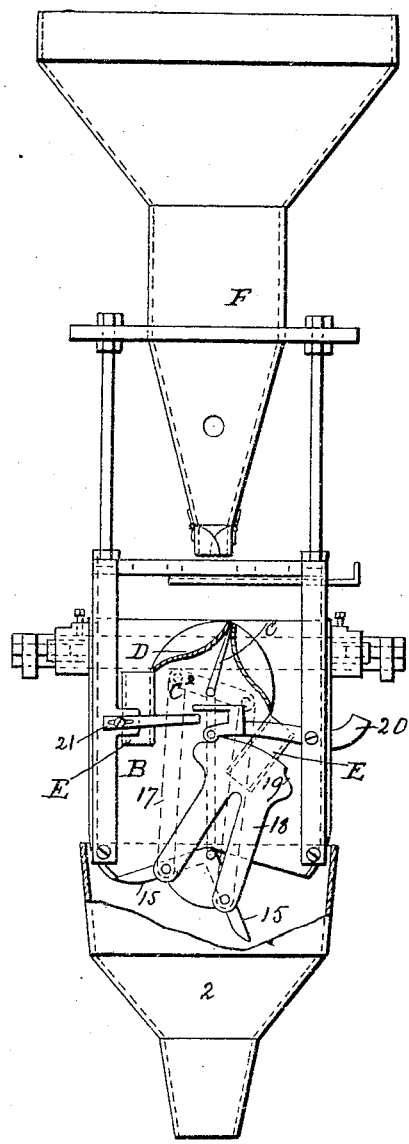

Figure 1 is a sectional elevational view of feeding mechanism embodying features of my invention, showing the same applied to a well-known construction of automatic grain-weighing apparatus of the twin-bucket type. Fig. 2 is a fragmentary perspective view of the receptive hopper, showing more particularly its slide or cut-off. Fig. 3 is a perspective view of the hinged support that carries the saddle or distributing device which constitutes an element of the feeding mechanism. Fig. 4 is a perspective view of the detachable baffle-carrying frame which is carried within the receptive hopper. Fig. 5 is a front elevational view of an automatic weighing-scale embodying my improvements, a portion of the discharge-hopper being broken away to disclose one of the gates of the twin bucket; and Fig. 6 is a side elevational view of the machine, a portion of the discharge-hopper being broken away to disclose the general arrangement of the twin bucket and its gates and connections for operating the same. In this view one wall of the bucket is removed, so as to illustrate the arresting device or saddle, which appears partly in section.

Referring to the drawings, B represents a twin bucket having a division wall or partition B', which terminates a distance below the top of the bucket, which distance is compensated for by a plate or member C, supported by a rod or pintle C', that is movable in the sides of the bucket by means of an arm or cross-bar $C^2$. Straddling the hinged plate or support C is a distributing-pan or saddle D, consisting of two coincident concavo-convex wings D', having end plates $D^2$, which are slotted, as at $D^3$, to accommodate the rod or pintle C'. The wings or members D' may carry at their bases the rectangular frames or chutes E, which are convergent in respect to one another or out of perpendicular with the apex of the saddle.

The purpose of the chutes E is to cause the coffee or other grain being weighed to pile up in the respective compartment of the bucket, and thus have its surface as near the feed-hopper as possible, and thus avoid injury to the sensitive scale mechanism from shock.

Mounted above the saddle or distributing-pan D is a feed-hopper F, having its bottom contracted and provided with a cut-off or slide F', which controls the supply of grain to the distributing member or saddle D. The hopper F is provided with inclined baffles G, projecting from two opposite walls thereof and staggered in respect to each other or arranged in alternate series, with the baffles of one set overhanging those of the other, so that the grain is fed in a steady stream from one baffle to another through the hopper. One way of effecting this provision is illustrated in Fig. 4, which shows the baffles G sustained and carried by a frame G', arranged to telescope the hopper F.

From the foregoing description it will be understood that the coffee or other grain to be weighed is supplied to the feed-hopper F and traversing successively the various baffles is fed gradually and in a comparatively even stream to the contracted base of the hopper, from whence, assuming that the slide F' has been withdrawn, the coffee or other grain falls upon one of the wings D' of the saddle or distributing device D and lies upon its concave surface until displaced by succeeding grains, and when the requisite quantity has accumulated to produce the desired weight the movable or hinged support C is shifted, whereby the saddle is oscillated to position it for feeding material to the other compartment of the bucket. It will thus be observed that the necessity for the use of a separate continuous small stream for making up the deficit and power for feeding such stream is completely obviated, because the saddle is the sole distributing source, and the coffee lies there until forced by the gravitation of the grains subsequently falling.

Referring to Figs. 5 and 6, it will be seen that the twin bucket B discharges into the hopper 2 and is provided with pivotal valve-gates 15, which are so arranged that when one is open the other is closed, and means are provided for transmitting motion from the gates 15 to the pintle C', so as to cause the saddle to simultaneously reverse its position with each reverse movement of the valve-gates 15. Said means comprises a lever C², rigidly mounted at one end of the pintle C', and connected with the valve-gates 15 by means of connecting-rods 17, as clearly shown in Figs. 5 and 6. As before stated, the arrangement of the valve-gates is such that when one is open the other is closed, and this condition is maintained by means of an arm 18, applied to the gates and having notched portions 19, adapted to be engaged at different times by a locking arm or lever 20, attached to the bucket. Said lever 20 is generally in engagement with one or the other of said notched portions 19 and is not disengaged therefrom until the bucket descends under the weight of the material being weighed, when said arm or lever 20 is tripped by a bar or projection 21 and engages the opposite notched portion.

In the operation of the machine the coffee or other granular material enters the receiving-hopper F and is fed by force of gravity through the same and strikes the exposed side of the saddle or arresting device, from whence it is deflected through the tubular parts or chutes E into the corresponding compartment of the twin bucket, which then has its valve-gate 15 closed. The purpose of the tubular parts or chutes E is to force the material being weighed to pile up through them on the saddle, thereby raising the level of the coffee or other material being weighed to the top of the saddle, and thus, in conjuction with the instantaneous oscillation of the saddle with the opening and closing of the gates, completely eliminating the suspended stream which would otherwise exist between them at the moment the scale trips and causes instantaneous oscillation of the saddle and preventing the shock to the sensitive scale which would occur when the coffee or other material falls from a greater distance, the suspended stream being taken care of in the present instance by the concave side portion of the saddle. Besides eliminating the suspended stream the saddle D also eliminates or takes the place of the independent continuous stream and weighs accurately without the use of any power except the force of gravity. When sufficient coffee or other material being weighed accumulates in the bucket D to produce the desired weight, it causes the bucket to sink, whereby the locking arm or lever 20 is caused to trip on the bar 21, thereby freeing the valve-gate 15, which was held in closed position through the medium of arm 18 and closing the other gate 15 and maintaining it closed until the operation is repeated. The coffee or other material being weighed falls into the discharge-hopper 2 and from there into the package.

The scale mechanism proper, which is indicated at A, forms no specific part of this invention and is not referred to in detail, for the reason that a minute description of it is not essential to a clear understanding of the present invention.

Where a machine having a single bucket is employed, it will be apparent that only one wing of concavo-convex surface is required, and such wing would be attached to one wall of the bucket, the hinged support C being dispensed with.

It will be obvious to those skilled in the art to which the invention relates that modifications may be made in details without departing from the spirit and scope of the same. Hence I do not limit myself to the precise construction and arrangement of parts hereinbefore referred to and illustrated in the accompanying drawings; but, Having described the nature and objects of the invention, what I claim as new, and desire to secure by Letters Patent, is—

1. The combination in an automatic weighing apparatus, of a feed-hopper, a bucket below said hopper having a partition dividing it into separate compartments, a hinged support above the partition, a distributing-saddle mounted on said support having concavo-convex wings or sides terminating in chutes, whereby the material to be weighed is caused to pile up in the respective compartment of the bucket, and an arm whereby said support and saddle may be oscillated to cause the material to be deflected into one or the other compartment of the bucket, substantially as described.

2. The combination in an automatic weighing apparatus, of a feed-hopper, a bucket below said hopper having a partition dividing it into separate compartments, a hinged support above the partition, a distributing-saddle mounted on said support having concavo-convex wings or sides terminating in chutes which are convergent in respect to one another, whereby the material to be weighed is caused to pile up in the respective compartment of the bucket, and means whereby said support and saddle may be oscillated to cause the material to be deflected into one or the other compartment of the bucket, substantially as described.

In testimony whereof I affix my signature in presence of two witnesses.

HARRY HAGER.

Witnesses:
EDWARD C. SCHWEITZER,
ALBERT G. HUBBARD.